United States Patent
Lacy

(10) Patent No.: US 9,646,794 B2
(45) Date of Patent: May 9, 2017

(54) MOBILE VEHICLE OR EQUIPMENT ELECTRICAL CIRCUIT DISABLER

(71) Applicant: Ted Michael Lacy, Worley, ID (US)

(72) Inventor: Ted Michael Lacy, Worley, ID (US)

(*) Notice: Subject to any disclaimer, the term of this patent is extended or adjusted under 35 U.S.C. 154(b) by 977 days.

(21) Appl. No.: 13/733,001

(22) Filed: Jan. 2, 2013

(65) Prior Publication Data
US 2014/0183943 A1 Jul. 3, 2014

(51) Int. Cl.
*B60R 16/03* (2006.01)
*H01H 85/22* (2006.01)
*H01H 85/20* (2006.01)
*H01H 85/25* (2006.01)

(52) U.S. Cl.
CPC ............ *H01H 85/22* (2013.01); *B60R 16/03* (2013.01); *H01H 85/2045* (2013.01); *H01H 85/25* (2013.01); *H01H 2085/206* (2013.01); *H01H 2085/208* (2013.01)

(58) Field of Classification Search
CPC . B60R 16/03; B60R 16/0235; B60R 16/0238; B60R 16/0239
USPC ............... 307/9.1, 10.1, 10.6, 10.7, 10.8; 439/620.31
See application file for complete search history.

(56) References Cited

U.S. PATENT DOCUMENTS

| | | | | |
|---|---|---|---|---|
| 5,476,396 | A | * | 12/1995 | De Castro ................. 439/692 |
| 7,012,519 | B2 | * | 3/2006 | Lacy et al. ............ 340/539.11 |
| 7,530,851 | B2 | * | 5/2009 | Parnis ..................... 439/620.29 |
| 2015/0367791 | A1 | * | 12/2015 | Aboudaoud ........... B60R 16/03 307/9.1 |

* cited by examiner

*Primary Examiner* — Fritz M Fleming

(57) ABSTRACT

This invention is a way to disable a electrical circuit in a mobile vehicle or equipment. This invention works in conjunction with our previous Patent, EMERGENCY SHUT-OFF SYSTEM FOR POWER MACHINERY, WIRELESS MONITORING SYSTEMS, AND EMERGENCY SHUT-OFF METHODS. U.S. Pat. No. 7,012,519. This system allows a new vehicle or equipment to have a remote controller of the ignition circuit installed, without cutting or damaging the wire harness. This system will not void the manufacture warranty of engine module or computer system. This system will shorten the time required to install our "FOX-PAWS" shut down switch, thus saving the customer time and money.

2 Claims, 3 Drawing Sheets

MOBILE VEHICLE OR EQUIPMENT ELECTRICAL CIRCUIT DISABLER

BACKGROUND OF THE INVENTION

When our Patent was granted, the simple way to connect our unit to a gas engine was at the coil circuit and with a diesel engine was at the injector pump solenoid circuit. Either circuit is controlled by the ignition key. Turn on the ignition key in either case, the engines will start and run. With our unit; powered by these circuits, the key can be on, engine running and our unit can shut off the engine while the key is in the ON position. This has proven to be a very reliable source of safety for our customers. If there arises a problem with the engine running, the operator of the vehicle or equipment or a standby person can remotely shut off the engine.

With the success of our patented wireless shut down switch for engines has grown, more customers are now purchasing our units to be installed on new vehicles or equipment. With the new engines systems today, they are either controlled by a computer or engine module. There is no easy way to connect our unit to the engines computer system without cutting wiring or hacking into the computer system. These manufactures will not warranty their products if the wiring has been cut or tampered with. Our customers want our product attached to their truck or equipment but at the same time are reluctant to cut up the wiring or do something that might damage the computer system. The customer would like to keep the factory warranty intact, in case they ever have a problem in the future. Our customers have asked us to figure out a way to solve this problem. If we wanted to sell units and satisfy our customer base, we had to come up with a simple solution.

We searched for a commercial solution already being manufactured, but did not find one. What we did learn in our research, that most manufactures of vehicles and equipment were protecting their computer system or engine modules by a fuse circuit controlled by the ignition key.

SUMMARY OF THE INVENTION

Aspects of this invention relate to disable an electrical circuit in a mobile vehicle or equipment.

For example, this method will work for most vehicles or equipment manufactured today. Start the engine of the equipment to be controlled. Find the Battery/Ignition fuse in the fuse panel. While engine is running, remove this fuse. Engine will shut off.

Remove the Battery/ignition fuse from the fuse panel of the vehicle or piece of equipment. It is normally 10-15 amperes. In this empty Battery/Ignition fuse slot plug in 104.

Each of these wires are connected to the 2 terminals fuse ends respectfully. One of the wires is connects to an inline fuse holder, and the other end of the fuse holder connects to one main terminal of the solenoid 107 The other wire coming out of 104 goes to the other main terminal of the solenoid 107. The original fuse that was taken out of the fuse panel is inserted into the new inline fuse holder.

By applying control power to the solenoid, this solenoid internally energizes, connecting the 2 wires that are now connected to 104 By removing control power from the solenoid 107, the circuit is disabled.

We can now remotely shut off the engine with the Wireless Fox-Paws Models 100-300 or our Fox-Paws corded Model 500 with the ignition key in the ON position.

We have now made a circuit with the same rated capacity and fusing as the original, but now have the capability of disabling the circuit as needed. We had now solved the problem of installing our units on new vehicles or equipment without voiding the manufactures warranty.

BRIEF DESCRIPTION OF THE DRAWINGS

Preferred embodiments of the invention are described below with reference to the following drawings.

FIG. 1 shows block diagram of flow of power.

DETAILED DESCRIPTION OF THE PREFERRED EMBODIMENTS

Figure 1:
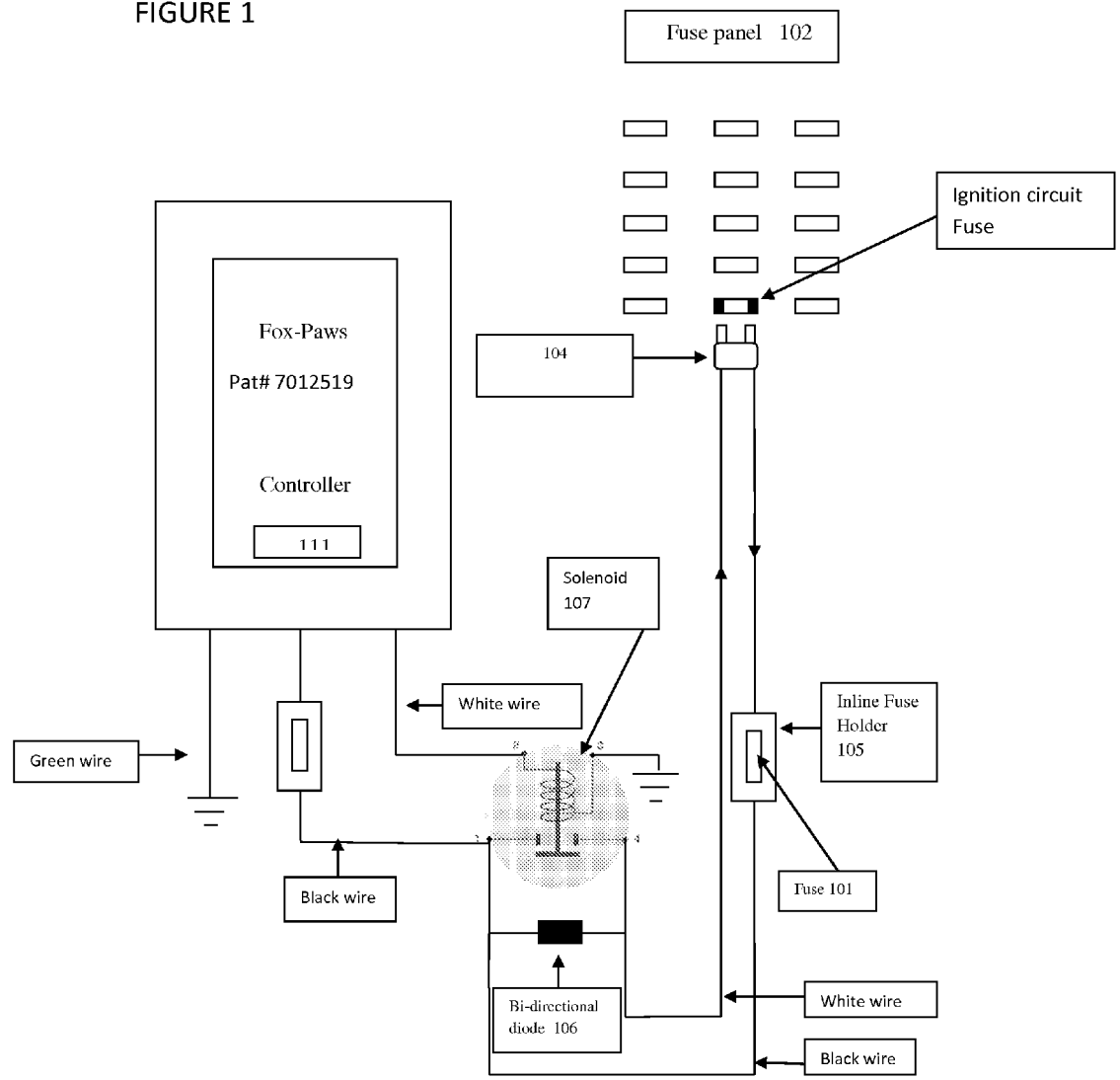
FIG. 1 is an exemplary schematic illustrating the components that make up the circuit to be disabled.

FIG. 1 is an exemplary drawing of the mobile vehicle or equipment electrical circuit disabler. 101 ignition fuse is removed from 102 fuse panel. 104 is plugged into 102 fuse panel. Correct polarity of Device is noted with respect to the fuse panel 102 (See FIG. 2) The Black wire of 104 is connected to terminal 1 of solenoid 107 and the White wire of 104 is connected to terminal 4 of solenoid 107. "Fox-Paw" Controller 111 Black feed wire is connected to terminal 1 of solenoid 107. White wire of "Fox-Paw" Controller 111 is connected to terminal 2 of solenoid 107. Both base of solenoid 107 and Green wire of 'Fox-Paws" Controller 111 are grounded to frame of vehicle or equipment.

FIG. 1 shows wiring of "Fox-Paws" shut down switch with Mobile vehicle or equipment electrical circuit disabler wire harness.

Directions to connect Fox-Paws to vehicle:

Step 1: Start engine. Remove fuse from ignition circuit. Make sure this fuse stops the engine.

Figure 2:
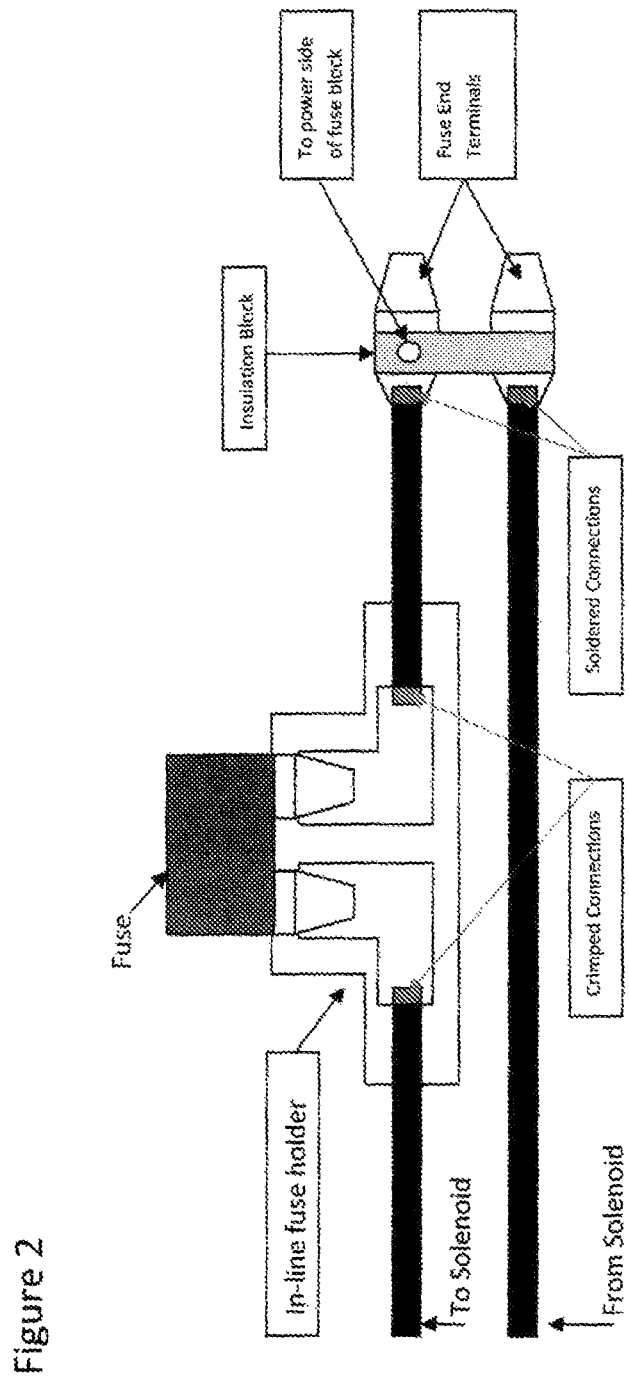
FIG. 2 is a drawing describing the wire harness.

Step 2: Using VOM or test light with key in the on position, find port with power of ignition circuit of fuse panel 102. Make sure white dot on 104 corresponds to terminal with power, (FIG. 2).

Step 3: Plug in 104.

Step 4: Plug original fuse 101 into in-line fuse holder 105 on wire harness. (See FIG. 2)

Step 5: Connect Black wire of 104 to terminal #1 of solenoid 107 and connect White wire of 104 to terminal #4 of solenoid 107

Step 6: Ground green round wire of "Fox-Paws" Controller 111 and base of solenoid 107 to vehicle or equipment.

Figure 3:
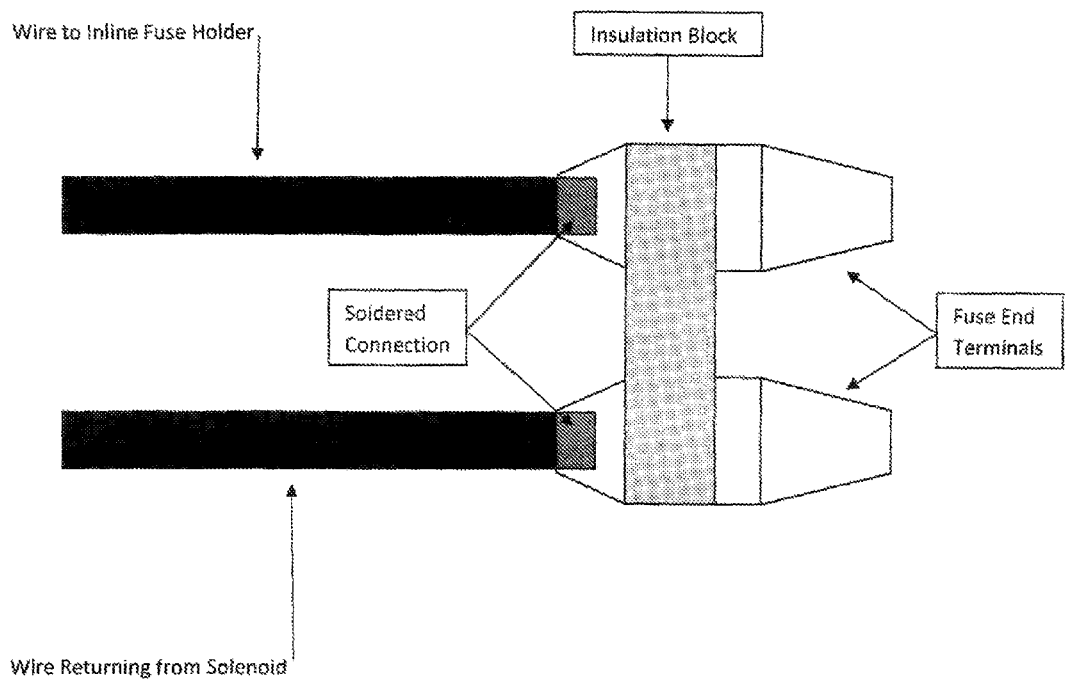
FIG. 3 is a drawing of 104 with 2 wires that plugs into the Fuse Panel.

FIG. 3 is a drawing of the 104. This drawing details the 2 wires entering into the main body of said device connected to the 2 terminals which plug into the fuse panel slots respectfully. FIG. 2 is a drawing of in-line fuse holder 105 showing placement of fuse 101.

FIG. 1 is a flow chart describing the flow of electrical power from and returning to the fuse panel 102. Power is taken from the fuse panel 102 by way of 104. It is noted on FIG. 2, 104 has a white dot on the top corner of this said piece. In FIG. 2 the white dot corresponds to the terminal with power of fuse panel 102. If 104 is placed backwards in fuse panel 102 the circuit disabler will not work at all. When 104 is installed into fuse panel 102 the Black feed wire, corresponding to terminal with power of fuse panel 102. Said Black wire is connected to an inline fuse holder 105. Fuse 101 is inserted into inline fuse holder 105, (See FIG. 2). The other end of inline fuse holder 9 Black wire) is connected to one side of bi-directional diode 106 and terminal 1 of solenoid 107. The return wire (White wire) of 104 is connected to the other side of bi-directional diode 106 and terminal 4 of solenoid 107 respectfully. This return side of 104 (White wire) is connected to the return side of said fuse slot of fuse panel 102.

Black power wire of controller "Fox-Paws" Controller 111 is connected to terminal 1 of solenoid 107. White wire of controller "Fox-Paws" Controller 111 is connected to terminal 2 of solenoid 107. Green wire of controller "Fox-Paws" Controller 111, as well as base of solenoid 107 are both grounded to frame of vehicle or equipment.

When "Fox-Paws" Controller 111 is in Green (operate) mode, power will flow into Black wire of "Fox-Paws" Controller 111, powering terminal 2 of solenoid 107. When solenoid 107 is energized, power will flow between connection 1&4 of solenoid 107, thus completing the circuit. Engine of vehicle or equipment will start and run.

When "Fox-Paws" Controller 111 is in the Red (stop) Mode, power flowing from Controller 111 to terminal 2 of solenoid 107 will be shut off, thus disabling the circuit between terminal 1&4 of solenoid 107. When power through 107 is disabled, ignition circuit of fuse panel 102 will stop. Engine will stop. Engine will not start or run.

The invention claimed is:

1. An electrical circuit disabler for a mobile vehicle or piece of equipment, said mobile vehicle or piece of equipment having a fuse panel with a fuse slot for an original battery or ignition fuse, said mobile vehicle or piece of equipment having an engine, said electrical circuit disabler comprising:
   a device having first and second fuse terminals and first and second wires, each of said first and second device wires connected to respective said first and second device fuse terminals, said device plugs into said fuse slot in place of said original battery or ignition fuse, said first device wire connected to one of said first fuse terminal such that said first device wire is connected to power from said fuse panel;
   an inline fuse holder with first and second inline fuse holder wires, said first inline fuse holder wire connected to said first device wire, said original battery or ignition fuse plugged into said inline fuse holder;
   a solenoid with four terminals, a first of said four solenoid terminals connected to said first inline fuse holder wire, a fourth of said four solenoid terminals connected to said second device wire, and a third of said four solenoid terminals connected to ground;
   a controller with three wires and first and second modes, a first of said three controller wires connected to said first of said four solenoid terminals, a second of said three controller wires connected to a second of said four solenoid terminals, and a third of said three controller wires connected to said ground;
   wherein, when the controller is in the first mode, the second of said three controller wires is powered and the solenoid is energized, such that the power from said fuse panel will flow between the first and fourth of said four solenoid terminals and the engine will start and run;
   and wherein, when the controller is in the second mode, the second of said three controller wires is not powered and the solenoid is shut off, such that power from said fuse panel is disabled from flowing between the first and fourth of said four solenoid terminals and the engine will neither start or run.

2. A method of connecting the electrical circuit disabler of claim 1 to said mobile vehicle or piece of equipment,
   starting said engine so that said engine is running,
   removing said original battery or ignition fuse from said fuse panel such that said engine stops running,
   plugging the device into said fuse panel where the original battery or ignition fuse was, plugging the original battery or ignition fuse into the inline fuse holder,
   connecting the inline fuse holder as set forth in claim 1,
   connecting the four solenoid terminals as set forth in claim 1,
   and connecting the three controller wires as set forth in claim 1.

* * * * *